US011329500B2

(12) United States Patent
Kuo et al.

(10) Patent No.: US 11,329,500 B2
(45) Date of Patent: May 10, 2022

(54) CHARGING AND DISCHARGING DEVICE AND CHARGING AND DISCHARGING METHOD

(71) Applicant: Industrial Technology Research Institute, Hsinchu (TW)

(72) Inventors: Shu-Wei Kuo, Tainan (TW); Chang-Chung Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 233 days.

(21) Appl. No.: 16/747,541

(22) Filed: Jan. 21, 2020

(65) Prior Publication Data
US 2020/0244094 A1 Jul. 30, 2020

Related U.S. Application Data

(60) Provisional application No. 62/798,493, filed on Jan. 30, 2019.

(51) Int. Cl.
*H02J 7/00* (2006.01)
*H02J 7/35* (2006.01)
(Continued)

(52) U.S. Cl.
CPC ............ *H02J 7/35* (2013.01); *H02J 3/32* (2013.01); *H02J 3/381* (2013.01); *H02J 7/007* (2013.01);
(Continued)

(58) Field of Classification Search
USPC .......................... 320/101, 102, 103, 106, 107
See application file for complete search history.

(56) References Cited

U.S. PATENT DOCUMENTS 9,536,205 B2    1/2017   Ye et al.
9,941,734 B2    4/2018   Sano et al.
(Continued)

FOREIGN PATENT DOCUMENTS

CN    102324873    1/2012
CN    102511117    6/2012
(Continued)

OTHER PUBLICATIONS

Guishi Wang, et al., "Power Smoothing of Large Solar PV Plant Using Hybrid Energy Storage." IEEE Transactions on Sustainable Energy, vol. 5, No. 3, Jul. 2014, pp. 834-842.
(Continued)

*Primary Examiner* — Brian Ngo
(74) *Attorney, Agent, or Firm* — JCIPRNET

(57) ABSTRACT

A charging-and-discharging device and a charging-and-discharging method are provided. The charging-and-discharging device includes a renewable energy converter, an aluminum battery, a controller and a current converter. The renewable energy converter receives a power from a renewable energy power generation system. The controller is coupled to the renewable energy converter and the aluminum battery, wherein the controller configures a charging-and-discharging power of the aluminum battery, according to a power value of the power, to compensate the power so as to generate a compensated power. The current converter is coupled to the controller, wherein the current converter outputs the compensated power to a power grid after performing DC/AC converting.

22 Claims, 4 Drawing Sheets

(51) Int. Cl.
*H02J 3/38* (2006.01)
*H02J 3/32* (2006.01)

(52) U.S. Cl.
CPC ....... *H02J 2207/20* (2020.01); *H02J 2300/24* (2020.01)

(56) References Cited

U.S. PATENT DOCUMENTS

| | | | |
|---|---|---|---|
| 9,997,953 B2 | 6/2018 | Sano et al. | |
| 2010/0250043 A1* | 9/2010 | Scheucher | B60L 58/12 |
| | | | 701/22 |
| 2013/0035802 A1* | 2/2013 | Khaitan | H02J 3/386 |
| | | | 700/297 |
| 2013/0107601 A1* | 5/2013 | Wagoner | H01L 23/427 |
| | | | 363/141 |
| 2013/0257152 A1* | 10/2013 | Matsui | H02J 7/022 |
| | | | 307/22 |
| 2015/0008750 A1* | 1/2015 | Shen | H02M 7/483 |
| | | | 307/82 |
| 2017/0098279 A1* | 4/2017 | Vickery | G06Q 10/0635 |
| 2018/0152131 A1* | 5/2018 | Vidhi | G05F 1/67 |

FOREIGN PATENT DOCUMENTS

| | | | |
|---|---|---|---|
| CN | 103081290 | 5/2013 | |
| CN | 103187807 | 7/2013 | |
| CN | 102244390 | 12/2013 | |
| CN | 103944175 | 7/2014 | |
| CN | 104682435 | 6/2015 | |
| CN | 103986190 | 3/2016 | |
| CN | 105591380 | 5/2016 | |
| CN | 105680458 | 6/2016 | |
| CN | 104682436 | 1/2017 | |
| CN | 104682449 | 1/2017 | |
| CN | 105406504 | 12/2017 | |
| CN | 105656085 | 6/2018 | |
| CN | 105680486 | 9/2018 | |
| CN | 108599197 | 9/2018 | |
| KR | 20130051772 A * | 5/2013 | |
| TW | I380551 | 12/2012 | |
| TW | I389417 | 3/2013 | |
| TW | 201526458 | 7/2015 | |
| TW | I492182 | 7/2015 | |
| TW | I523380 | 2/2016 | |
| TW | I524619 | 3/2016 | |
| TW | I540822 | 7/2016 | |
| TW | I553440 | 10/2016 | |
| TW | I587601 | 6/2017 | |
| TW | I637332 | 10/2018 | |
| WO | 2012144357 | 10/2012 | |
| WO | WO-2013161237 A2 * | 10/2013 | ............. H02J 3/381 |
| WO | 2015061360 | 4/2015 | |

OTHER PUBLICATIONS

M. J. E. Alam, et al., "A Novel Approach for Ramp-Rate Control of Solar PV Using Energy Storage to Mitigate Output Fluctuations Caused by Cloud Passing." IEEE Transactions on Energy Conversion, vol. 29, No. 2, Jun. 2014, pp. 507-518.

Xiangjun Li, et al., "Battery Energy Storage Station (BESS)-Based Smoothing Control of Photovoltaic (PV) and Wind Power Generation Fluctuations." IEEE Transactions on Sustainable Energy, vol. 4, No. 2, Apr. 2013, pp. 464-473.

"Office Action of Taiwan Counterpart Application", dated Aug. 3, 2020, pp. 1-5.

* cited by examiner

CHARGING AND DISCHARGING DEVICE AND CHARGING AND DISCHARGING METHOD

CROSS-REFERENCE TO RELATED APPLICATION

This application claims the priority benefit of U.S. provisional application No. 62/798,493, filed on Jan. 30, 2019. The entirety of the above-mentioned patent application is hereby incorporated by reference herein and made a part of this specification.

TECHNICAL FIELD

The disclosure relates to a charging-and-discharging device and a charging-and-discharging method, and to a charging-and-discharging device and a charging-and-discharging method adapted to a renewable energy power generation system.

BACKGROUND

The uncertainty of renewable energy can easily affect the stability of a power generation system. For example, the solar panels of a solar power generation system may be intermittently shielded, resulting in a sudden decrease and/or a sudden increase in an output power, thereby affecting the stability of a power grid of commercial power. All advanced countries require a maximum rate of change in the output power of the renewable energy power generation system. The maximum rate of change of the output power will vary depending on the environment. The maximum rate of change of the output power of the renewable energy generation system needs to comply with local regulations. Accordingly, those skilled in the art are all committed to researching a renewable energy power generation system capable of reducing the rate of change of the output power.

Therefore, how to reduce a ratio of power generation and configured batteries thereby reducing a required battery capacity and reducing a volume occupied by the battery is also one of the goals of those skilled in the art.

SUMMARY

The disclosure provides a charging-and-discharging device and a charging-and-discharging method adapted to a renewable energy power generation system which can smooth an out power curve of the renewable energy power generation system.

A charging-and-discharging device adapted to a renewable energy power generation system of the disclosure includes a renewable energy converter, an aluminum battery, a controller and a current converter. The renewable energy converter receives a power from a renewable energy power generation system. The controller is coupled to the renewable energy converter and the aluminum battery, wherein the controller configures a charging-and-discharging power of the aluminum battery, according to a power value of the power, to compensate the power so as to generate a compensated power. The current converter is coupled to the controller, wherein the current converter outputs the compensated power to a power grid after performing DC/AC converting.

In an embodiment of the disclosure, the controller generates a fitting curve of the power according to the power value of the power, and configures the charging-and-discharging power of the aluminum battery according to the fitting curve so as to compensate the power.

In an embodiment of the disclosure, the controller calculates a compensation value according to a difference between a current power value of the power and a function value of the fitting curve, and compensates the power according to the compensation value.

In an embodiment of the disclosure, the controller determines that the compensation value is a negative value in response to the current power value greater than the function value of the fitting curve, and determines that the compensation value is a positive value in response to the current power value less than the function value of the fitting curve.

In an embodiment of the disclosure, in response to a ratio of the difference and the current power value greater than or equal to a first margin, and the function value of the fitting curve greater than zero, the controller determines that the compensation value is equal to the first margin, wherein the first margin is defined as a maximum positive rate of change of the power.

In an embodiment of the disclosure, in response to a ratio of the difference and the current power value greater than or equal to a second margin, and the function value of the fitting curve less than zero, the controller determines that an absolute value of the compensation value is equal to the second margin, wherein the second margin is defined as a maximum negative rate of change of the power.

In an embodiment of the disclosure, in response to a ratio of the difference and the current power value less than a first margin, and the function value of the fitting curve greater than zero, the controller determines that the compensation value is equal to the ratio, wherein the first margin is defined as a maximum positive rate of change of the power.

In an embodiment of the disclosure, in response to a ratio of the difference and the current power value less than a second margin, and the function value of the fitting curve less than zero, the controller determines that an absolute value of the compensation value is equal to the ratio, wherein the second margin is defined as a maximum negative rate of change of the power.

In an embodiment of the disclosure, in response to a ratio of the difference and the current power value greater than or equal to a maximum charging rate of the aluminum battery, and the function value of the fitting curve less than zero, the controller determines that an absolute value of the compensation value is equal to the maximum charging rate.

In an embodiment of the disclosure, in response to a ratio of the difference and the current power value greater than or equal to a maximum discharging rate of the aluminum battery, and the function value of the fitting curve greater than zero, the controller determines that the compensation value is equal to the maximum discharging rate.

In an embodiment of the disclosure, values of the first margin and the second margin of the power are different, the first margin is defined as a maximum positive rate of change of the power, and the second margin is defined as a maximum negative rate of change of the power.

In an embodiment of the disclosure, a capacity of the aluminum battery is configured based on a wattage corresponding to a historical maximum rate of change of an output power of the renewable energy power generation system, wherein a field capacity of the renewable energy converter multiplied by the maximum positive rate of change is a rising norm value, and the field capacity multiplied by the maximum negative rate of change is a falling norm value.

In an embodiment of the disclosure, a C-rate of the aluminum battery is between 10 C and 60 C.

A charging-and-discharging method adapted to a renewable energy power generation system of the disclosure includes: receiving a power from the renewable energy power generation system; configuring a charging-and-discharging power of an aluminum battery according to a power value of the power so as to generate a compensated power; and outputting the compensated power to a power grid after performing DC/AC converting.

In an embodiment of the disclosure, the step of configuring the charging-and-discharging power of the aluminum battery according to the power value of the power so as to generate the compensated power includes: generating a fitting curve of the power according to the power value of the power, and configuring the charging-and-discharging power of the aluminum battery according to the fitting curve so as to compensate the power.

In an embodiment of the disclosure, the step of generating the fitting curve of the power according to the power value of the power, and configuring the charging-and-discharging power of the aluminum battery according to the fitting curve so as to compensate the power includes: calculating a compensation value according to a difference between a current power value of the power and a function value of the fitting curve, and compensating the power according to the compensation value.

In an embodiment of the disclosure, the step of calculating the compensation value according to the difference between the current power value of the power and the function value of the fitting curve includes: determining that the compensation value is a negative value in response to the current power value greater than the function value of the fitting curve, and determining that the compensation value is a positive value in response to the current power value less than the function value of the fitting curve.

In an embodiment of the disclosure, the step of calculating the compensation value according to the difference between the current power value of the power and the function value of the fitting curve includes: in response to a ratio of the difference and the current power value greater than or equal to a first margin, and the function value of the fitting curve greater than zero, determining that the compensation value is equal to the first margin, wherein the first margin is defined as a maximum positive rate of change of the power.

In an embodiment of the disclosure, the step of calculating the compensation value according to the difference between the current power value of the power and the function value of the fitting curve includes: in response to a ratio of the difference and the current power value greater than or equal to a second margin, and the function value of the fitting curve less than zero, determining that an absolute value of the compensation value is equal to the second margin, wherein the second margin is defined as a maximum negative rate of change of the power.

In an embodiment of the disclosure, the step of calculating the compensation value according to the difference between the current power value of the power and the function value of the fitting curve includes: in response to a ratio of the difference and the current power value less than a first margin, and the function value of the fitting curve greater than zero, determining that the compensation value is equal to the ratio, wherein the first margin is defined as a maximum positive rate of change of the power.

In an embodiment of the disclosure, the step of calculating the compensation value according to the difference between the current power value of the power and the function value of the fitting curve includes: in response to a ratio of the difference and the current power value less than a second margin, and the function value of the fitting curve less than zero, determining that an absolute value of the compensation value is equal to the ratio, wherein the second margin is defined as a maximum negative rate of change of the power.

In an embodiment of the disclosure, the step of calculating the compensation value according to the difference between the current power value of the power and the function value of the fitting curve includes: in response to a ratio of the difference and the current power value greater than or equal to a maximum charging rate of the aluminum battery, and the function value of the fitting curve less than zero, determining that the compensation value is equal to the maximum charging rate.

In an embodiment of the disclosure, the step of calculating the compensation value according to the difference between the current power value of the power and the function value of the fitting curve includes: in response to a ratio of the difference and the current power value greater than or equal to a maximum discharging rate of the aluminum battery, and the function value of the fitting curve greater than zero, determining that the compensation value is equal to the maximum discharging rate.

In an embodiment of the disclosure, values of the first margin and the second margin of the power are different, the first margin is defined as a maximum positive rate of change of the power, and the second margin is defined as a maximum negative rate of change of the power.

Based on the above, the charging-and-discharging device and charging-and-discharging method of the disclosure may estimate the fitting curve of the power according to the historical record of the power output by the renewable energy power generation system, so as to determine the compensation value for compensating the power according to the fitting curve.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
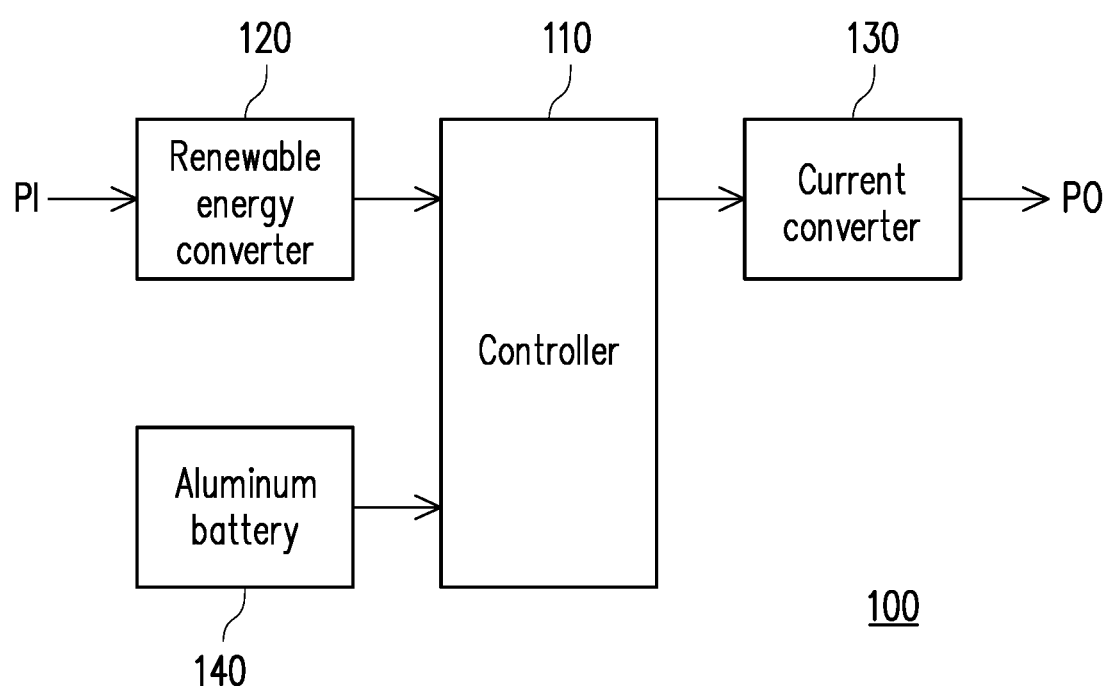
FIG. 1 is a schematic diagram of a charging-and-discharging device adapted to a renewable energy power generation system illustrated according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to make content of the disclosure more comprehensible, embodiments are described below as the examples to prove that the disclosure can actually be realized. Moreover, elements/components/steps with same reference numerals represent same or similar parts in the drawings and embodiments.

FIG. 1 is a schematic diagram of a charging-and-discharging device 100 adapted to a renewable energy power generation system illustrated according to an embodiment of the disclosure. The charging-and-discharging device 100 may convert DC power received from the renewable energy power generation system into AC power and integrate the AC power into a power grid of commercial power. The charging-and-discharging device 100 includes a controller 110, a renewable energy converter 120, a current converter 130 and an aluminum battery 140. In this embodiment, the renewable energy power generation system is, for example, a solar power generation system, but the disclosure is not limited thereto.

The controller 110 is, for example, a central processing unit (CPU) or other programmable micro control units (MCU) for general purpose or special purpose, a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA) or other similar elements or a combination of above-mentioned elements. The controller 110 is coupled to the renewable energy converter 120, the current converter 130 and the aluminum battery 140.

The renewable energy converter 120 is, for example, a power interface coupled to the renewable energy power generation system. Here, the renewable energy power generation system may convert a sunlight radiant energy into a power PI. The unit of the power PI is, for example, watts (W), and the power PI is also an actual power value. For instance, the renewable energy power generation system converts the sunlight radiant energy into the power PI through, for example, photovoltaic (PV) or concentrated solar power (CSP) technology. The charging-and-discharging device 100 receives the power PI through the renewable energy converter 120.

The current converter 130 is, for example, an inverter or a grid-tie inverter (GTI). The current converter 130 may convert the power PI into AC power. The controller 110 may configure the aluminum battery 140 to be charged or discharged. The controller 110 determines a charging-and-discharging power of the aluminum battery to compensate the power PI so as to generate a compensated power PO. The current converter 130 may also adjust frequency and phase of the compensated power PO so that the compensated power PO may be synchronized with commercial power.

The aluminum battery 140 has a capability of being quickly charged and discharged. In this embodiment, a C-rate of the aluminum battery may range between 10 C and 60 C. The controller 110 may configure the aluminum battery 140 to be quickly charged or discharged. Further, the controller 110 determines an output power or a charging power of the aluminum battery 140 so that a rate of change of the compensated power PO conforms to local regulations.

Figure 3:
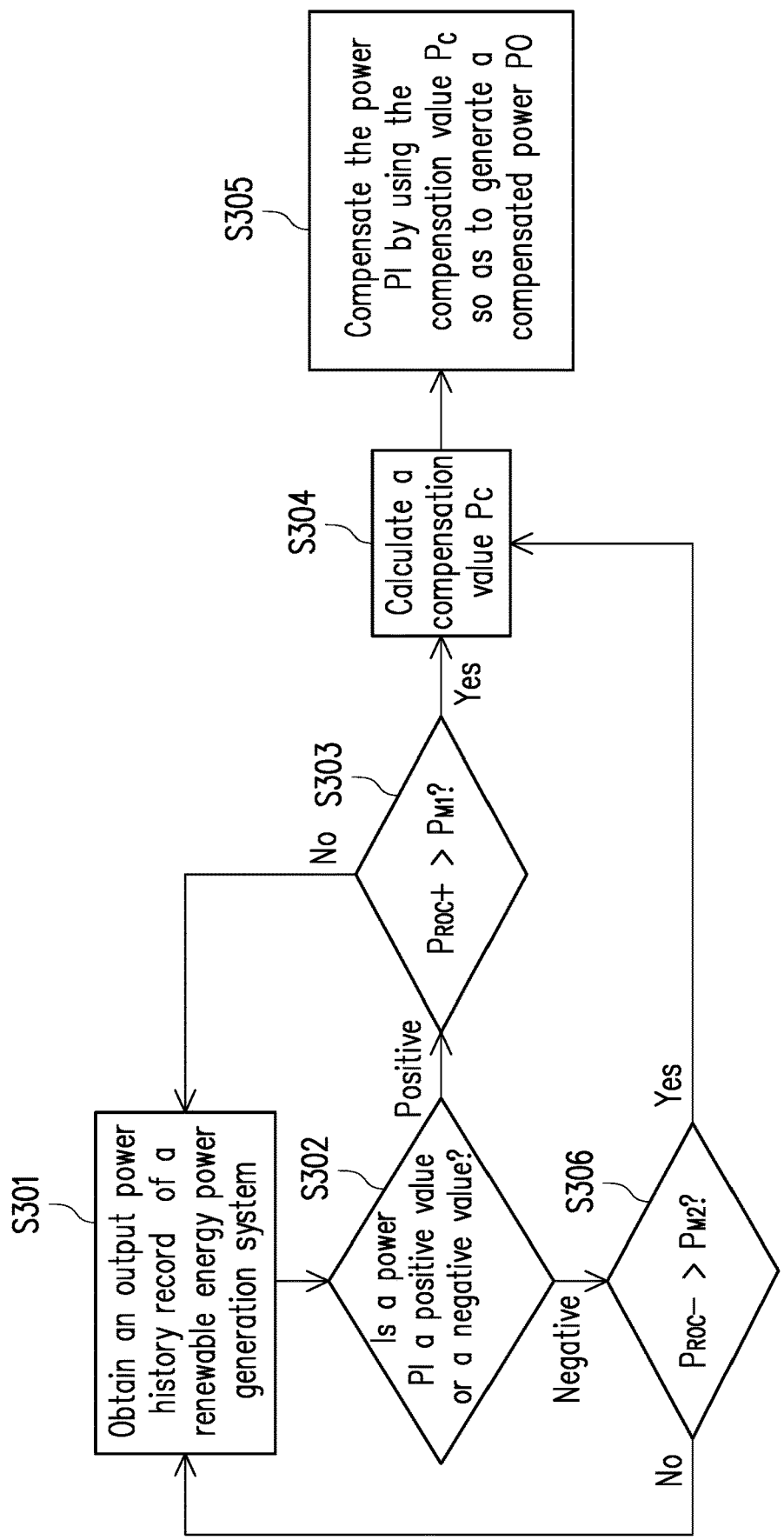
FIG. 3 is a flowchart of a charging-and-discharging method adapted to a renewable energy power generation system illustrated according to an embodiment of the disclosure.

In addition, with a smoothing strategy of the disclosure (as shown by FIG. 3) and compensation methods under various conditions of Equations (15) and (16), a real time compensation effect may be achieved. The output power at a current time is compensated to comply with a maximum positive rate of change or a maximum negative rate of change specified by the manager. Compared with the conventional batteries, a battery capacity (unit: Ah) of the charging-and-discharging device 100 using the aluminum battery 140 may be reduced by more than 20%.

Figure 2:
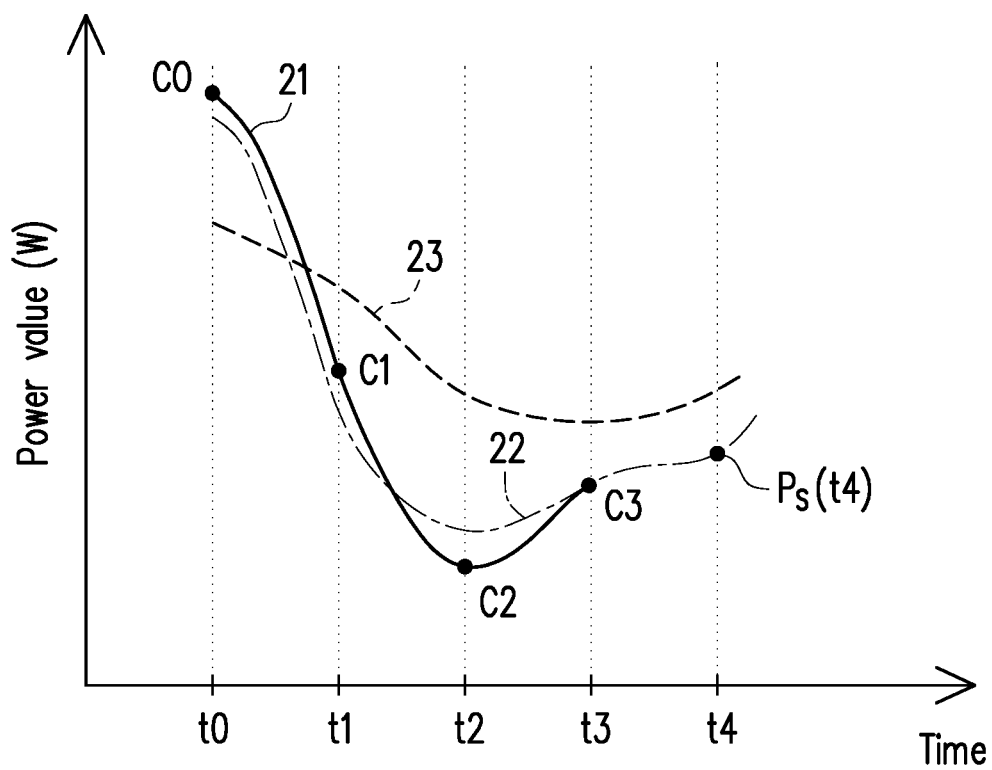
FIG. 2 illustrates a schematic diagram of a power curve of the power illustrated according to an embodiment of the disclosure.

FIG. 2 illustrates a schematic diagram of a power curve of the power illustrated according to an embodiment of the disclosure. As can be seen from FIG. 2, a power curve 21 of an uncompensated electric power output by the current converter 130 shows the sudden decrease between a time point t0 and a time point t2. This sudden decrease (e.g., the cloud cover the sun, causing the sudden decrease in power generation) may cause a negative rate of change of the uncompensated power output by the current converter 130 to be greater than the maximum negative rate of change locally specified, thereby affecting stability of the power grid. In order to make the rate of change of the power output by the current converter 130 comply with local regulations, the charging-and-discharging device 100 of the disclosure compensates the power PI to generate the compensated power PO to avoid the sudden increase or decrease of the power fed into the power grid. The compensated power PO has a power curve 23 that is relatively smooth, as shown in FIG. 2. Subsequently, the smoothing strategy is used to compare the smooth power curve 23 with the actual power curve 21, and adjust the charging-and-discharging power of the aluminum battery 140 to compensate the power PO under different conditions, as detailed below.

The controller 110 may configure the charging-and-discharging power of the aluminum battery 140, according to a power value of the power PI, to compensate the power PI so as to generate the compensated power PO. FIG. 3 is a flowchart of a charging-and-discharging method adapted to a renewable energy power generation system illustrated according to an embodiment of the disclosure. The charging-and-discharging method may be implemented by the charging-and-discharging device 100 shown in FIG. 1. FIG. 3 is also the smoothing strategy according to an embodiment of the disclosure.

In step S301, the controller 110 obtains an output power historical record of the renewable energy power generation system through the renewable energy converter 120. The output power historical record may include a plurality of power values respectively corresponding to the power at different time points. For instance, the output power historical record may include a power value $c_0$ corresponding to the time point $t_0$, a power value $c_1$ corresponding to the time point $t_1$, a power value $c_2$ corresponding to the time point $t_2$ and a power value $c_3$ corresponding to a time point $t_3$, as shown by Table 1.

TABLE 1

| Time point | $t_0$ | $t_1$ | $t_2$ | $t_3$ |
|---|---|---|---|---|
| Power value (W) | $c_0$ | $c_1$ | $c_2$ | $c_3$ |

The controller 110 may draw the power curve 21 shown in FIG. 2 according to the output power historical record shown in Table 1. The power value at each point on the power curve 21 is uncompensated, that is, each power value is an actual and original measurement value. In an embodiment, the controller 110 is further configured to obtain a power curve of the power grid of commercial power (i.e., the power grid coupled to the converter 130) and a storage capacity of the aluminum battery 140. The controller 110 may adjust the degree of compensation for the power PI by referring to the power curve of the power grid and the storage capacity of the aluminum battery 140. For example, if the storage capacity of the aluminum battery 140 is insufficient, the controller 110 may configure the aluminum battery 140 to be discharged with a smaller charging-and-discharging power.

In step S302, the controller 110 determines whether the power PI is a positive value or a negative value at a current time point. If the power PI is the positive value, the process proceeds to step S303. If the power PI is the negative value, the process proceeds to step S306. It is assumed that n represents a positive integer, T represents a sampling time, P(x) represents the power value of the power PI at a time point x, and nT represents the current time point (let x=nT). The controller may determine whether a rate of change $P_{ROC}$ of the power PI at the current time point nT is the positive value or the negative value according to Equation (1) below. After a difference is obtained from a current time point power P(nT) minus a previous time point power P(nT−1), the difference is divided by the current time point power P(nT) so the rate of change $P_{ROC}$ can then be obtained:

$$P_{ROC} = \frac{P(nT) - P(nT-1)}{P(nT)} \times 100\% \quad \text{Equation (1)}$$

In step S303, the controller 110 determines whether the rate of change $P_{ROC}$ of the power PI (or known as a positive rate of change $P_{ROC+}$) exceeds a first margin $P_{M1}$. Here, the first margin $P_{M1}$ is defined as the maximum positive rate of change of the power (e.g., the compensated power PO) fed into the power grid. The maximum positive rate of change may be specified by the manager based on the environment in which the renewable energy generation system is located. Here, the maximum positive rate of change and the maximum negative rate of change are specified by the government. The disclosure may further utilize these extreme values as values of the first margin and the second margin in the smoothing strategy of the disclosure. For example, "the maximum positive rate of change is 12%" means that the positive rate of change $P_{ROC+}$ of the compensated power PO to be fed into the power grid shall not exceed 12%. That is, the first margin $P_{M1}$ equals to 12%, but the actual application is not limited by this embodiment. Assuming that nT is the current time point, the controller 110 may determine whether the positive rate of change $P_{ROC+}$ of the power PI exceeds the first margin $P_{M1}$ according to Equation (2) below:

$$P_{ROC+} = \frac{|P(nT) - P(nT-1)|}{P(nT)} > P_{M1} \quad \text{Equation (2)}$$

If the positive rate of change $P_{ROC+}$ of the power PI exceeds the first margin $P_{M1}$, the process proceeds to step S304. If the positive rate of change $P_{ROC+}$ of the power PI does not exceed the first margin $P_{M1}$, the process proceeds to step S301.

In step S304, the controller 110 calculates a compensation value of the power PI (hereinafter referred as a compensation value $P_C$). First of all, the controller 110 generates a fitting curve of the power PI according to the power value of the power PI. Specifically, the controller 110 may first assume a power curve of the power PI as a polynomial A shown by Equation (3). Here, i represents a time index, $a_0$, $a_1$, ..., $a_{n-1}$ and $a_n$ are coefficients, and t is time:

$$A = a_0 + a_1 t_i \ldots a_{n-1} t_i^{n-1} + a_n t_i^n \quad \text{Equation (3)}$$

Next, the controller 110 generates an objective function Err corresponding to the fitting curve of the power PI according to the output power historical record of the power PI and the polynomial A. The objective function Err is as shown by Equation (4):

$$Err = \Sigma_{i=0}^{m-1}(A - P(t_i))^2 = \Sigma_{i=0}^{m-1}(a_0 + a_1 t_i \ldots a_{n-1} t_i^{n-1} + a_n t_i^n - P(t_i))^2 \quad \text{Equation (4)}$$

Here, i represents the time index, m represents the number of data entries (i.e., the power values of the power PI) included in the output power historical record, and $P(t_i)$ represents the power value of the power PI at a time point $t_i$. For instance, if the controller 110 generates the objective function Err according to the output power historical record shown in Table 1, the objective function Err may be expressed as Equation (5), wherein $c0=P(t_0)$, $c1=P(t_1)$, $c2=P(t_2)$ and $c3=P(t_3)$:

$$Err = (A-c0)^2 + (A-c1)^2 + (A-c2)^2 + (A-c3)^2 \quad \text{Equation (5)}$$

The controller 110 may minimize the objective function Err to calculate values of elements or the coefficients $a_0$, $a_1$, ..., $a_{n-1}$ and $a_n$ (e.g., through a least squares method), so as to obtain a function $P_S(t)$ of the fitting curve of the power PI (i.e., a fitting curve 22 shown in FIG. 2) as shown by Equation (6):

$$P_S(t) = a_0 + a_1 t \ldots a_{n-1} t^{n-1} + a_n t^n \quad \text{Equation (6)}$$

After the function $P_S(t)$ of the fitting curve 22 of the power PI is obtained, the controller 110 may calculate the compensation value $P_C$ according to a difference between a current power value of the power PI and a function value of the fitting curve 22. Specifically, at the current time point $t_i$, the controller 110 may first calculate a difference $P_D(t_i)$ between a current power value $P(t_i)$ and a function value $P_S(t_i)$ of the fitting curve 22, and calculate a ratio $P_{OI}(t_i)$ of the difference $P_D(t_i)$ and the current power value $P(t_i)$, as shown by Equation (7):

$$\begin{cases} P_D(t_i) = |P(t_i) - P_S(t_i)| \\ P_{OI}(t_i) = \frac{P_D(t_i)}{P(t_i)} \times 100\% \end{cases} \quad \text{Equation (7)}$$

Taking FIG. 2 as an example, if the controller 110 intends to calculate a compensation value $P_C(t_4)$ of the power PI at a current time point $t_4$, the controller 110 may first calculate a difference $P_D(t_4)$ between a current power value $P(t_4)$ and a function value $P_S(t_4)$ of the fitting curve 22, and calculate a ratio $P_{OI}(t_4)$ of the difference $P_D(t_4)$ and the current power value $P(t_4)$, as shown by Equation (8):

$$\begin{cases} P_D(t_4) = |P(t_4) - P_S(t_4)| \\ P_{OI}(t_4) = \frac{P_D(t_4)}{P(t_4)} \times 100\% \end{cases} \quad \text{Equation (8)}$$

After the ratio $P_{OI}(t_i)$ of the difference $P_D(t_i)$ and the current power value $P(t_i)$ is calculated, the controller 110 may determine the compensation value $P_C(t_i)$ according to the ratio $P_{OI}(t_i)$. Specifically, the controller 110 may, in response to the current power value $P(t_i)$ of the power PI greater than the function value $P_S(t_i)$ of the fitting curve 22, determine that the compensation value $P_C(t_i)$ should be the negative value (if $PI>P_S(t_i)$ and $P_C(t_i)<0$); in response to the current power value $P(t_i)$ of the power PI less than the function value $P_S(t_i)$ of the fitting curve 22, determine that the compensation value $P_C(t_i)$ should be the positive value (if $PI<P_S(t_i)$ and $P_C(t_i)>0$). When the compensation value $P_C(t_i)$ is the negative value, the controller 110 configures the aluminum battery 140 to be charged so as to perform a negative compensation for the power PI. Conversely, when the compensation value $P_C(t_i)$ is the positive value, the controller 110 configures the aluminum battery 140 to be discharged so as to perform a positive compensation for the power PI.

When the compensation value $P_C(t_i)$ is the negative value, a size of the compensation value $P_C(t_i)$ is limited by the second margin $P_{M2}$. Here, the second margin $P_{M2}$ is defined as the maximum negative rate of change of the power (e.g., the compensated power PO) fed into the power grid. The maximum negative rate of change may be specified according to the environment in which the renewable energy generation system is located. Here, the maximum positive rate of change and the maximum negative rate of change are specified by the government. The disclosure may further utilize these extreme values as values of the first margin and the second margin in the smoothing strategy of the disclosure. For example, "the maximum negative rate of change is 6%" means that a negative rate of change of the compensated power PO (hereinafter referred to as a negative rate of change $P_{ROC-}$) shall not exceed 6%. For the power grid, the sudden increase in the value of the fed-in power will have an adverse effect on the power grid. If the negative rate of change $P_{ROC-}$ of the compensated power PO is lower, it means that the sudden increase of the compensated power PO is less likely to happen in the future. In this way, a surge power generated by the sudden increase of the compensated power PO may be avoided, thereby preventing the renewable energy power generation system, the charging-and-discharging device 100 or the power grid from being damaged. In an embodiment, the manager may configure the second margin $P_{M2}$ to be less than the first margin $P_{M1}$. In other words, the manager may specify the maximum negative rate of change of the compensated power PO to be less than the maximum positive rate of change, wherein the maximum positive rate of change or the maximum negative rate of change may be set to, for example, 1% to 20%. In an embodiment, values of the first margin and the second margin of the power are different. In another embodiment, values of the first margin and the second margin of the power are identical.

In an embodiment, the controller 110 may, in response to the ratio $P_{Of}(t_i)$ greater than or equal to the second margin $P_{M2}$, and the compensation value $P_C(t_i)$ being the negative value (if $PI>P_S(t_i)$ (i.e., the power value $P(t_i)$ is greater than the function value $P_S(t_i)$ of the fitting curve 22 at the time point $t_i$), $P_C(t_i)<0$ (i.e., the compensation value is determined as the negative value)), determine that an absolute value of the compensation value $P_C(t_i)$ is equal to the second margin $P_{M2}$. The controller 110 limits that the absolute value of the compensation value $P_C(t_i)$ does not exceed the second margin $P_{M2}$. Here, the second margin $P_{M2}$ is defined as the maximum negative rate of change of the power (e.g., the compensated power PO) fed into the power grid. A mathematical formula of the compensation value $P_C(t_i)$ is shown by Equation (9).

$$|P_C(t_i)|=P_{M2}, \text{ if } P_{Of}(t_i) \geq P_{M2}, P_C(t_i)<0 \qquad \text{Equation (9)}$$

In an embodiment, the controller 110 may, in response to the ratio $P_{Of}(t_i)$ less than the second margin $P_{M2}$, and the compensation value $P_C(t_i)$ being the negative value (if $PI>P_S(t_i)$, $P_C(t_i)<0$), determine that the absolute value of the compensation value $P_C(t_i)$ is equal to the ratio $P_{Of}(t_i)$, wherein a mathematical formula thereof is shown by Equation (10).

$$|P_C(t_i)|=P_{Of}(t_i), \text{ if } P_{Of}(t_i)<P_{M2}, P_C(t_i)<0 \qquad \text{Equation (10)}$$

In an embodiment, the controller 110 may, in response to the ratio $P_{Of}(t_i)$ greater than or equal to a maximum charging rate $C_C$ of the aluminum battery 140, and the compensation value $P_C(t_i)$ being the negative value, (if $PI>P_S(t_i)$, $P_C(t_i)<0$), determine that the absolute value of the compensation value $P_C(t_i)$ is equal to the maximum charging rate $C_C$ of the aluminum battery 140, wherein a mathematical formula thereof is shown by Equation (11).

$$|P_C(t_i)|=C_C, \text{ if } P_{Of}(t_i) \geq C_C, P_C(t_i)<0 \qquad \text{Equation (11)}$$

In an embodiment, the controller 110 may, in response to the ratio $P_{Of}(t_i)$ greater than or equal to the first margin $P_{M1}$, and the compensation value $P_C(t_i)$ being the positive value (if $PI<P_S(t_i)$ (i.e., the power value $P(t_i)$ is less than the function value $P_S(t_i)$ of the fitting curve 22 at the time point $t_i$), $P_C(t_i)>0$ (i.e., the compensation value is determined as the positive value)), determine that the compensation value $P_C(t_i)$ is equal to the first margin $P_{M1}$, wherein a mathematical formula thereof is shown by Equation (12). In other words, when the compensation value $P_C(t_i)$ is the positive value, the controller 110 may limit that the compensation value $P_C(t_i)$ does not exceed the first margin $P_{M1}$. Here, the first margin $P_{M1}$ is defined as the maximum positive rate of change of the power (e.g., the compensated power PO) fed into the power grid.

$$P_C(t_i)=P_{M1}, \text{ if } P_{Of}(t_i) \geq P_{M1}, P_C(t_i)>0 \qquad \text{Equation (12)}$$

In an embodiment, the controller 110 may, in response to the ratio $P_{Of}(t_i)$ less than the first margin $P_{M1}$ and the compensation value $P_C(t_i)$ being the positive value (if $PI<P_S(t_i)$, $P_C(t_i)>0$), determine that the compensation value $P_C(t_i)$ is equal to the ratio $P_{Of}(t_i)$, wherein a mathematical formula thereof is shown by Equation (13).

$$P_C(t_i)=P_{Of}(t_i), \text{ if } P_{Of}(t_i)<P_{M1}, P_C(t_i)>0 \qquad \text{Equation (13)}$$

In an embodiment, the controller 110 may, in response to the ratio $P_{Of}(t_i)$ greater than or equal to a maximum discharging rate $C_D$ of the aluminum battery 140, and the compensation value $P_C(t_i)$ being the positive value, (if $PI<P_S(t_i)$, $P_C(t_i)>0$), determine that the compensation value $P_C(t_i)$ is equal to the maximum discharging rate $C_D$ of the aluminum battery 140, wherein a mathematical formula thereof is shown by Equation (14).

$$P_C(t_i)=C_D, \text{ if } P_{Of}(t_i) \geq C_D, P_C(t_i)>0 \qquad \text{Equation (14)}$$

Based on the above, the controller 110 may calculate the compensation value $P_C(t_i)$ according to the Equation (15) and Equation (16) shown below, wherein $C_C$ represents the maximum charging rate of the aluminum battery 140; $C_D$ represents the maximum discharging rate of the aluminum battery 140; $P_{Of}(t_i)$ represents the ratio of the difference $P_D(t_i)$ and the current power value $P(t_i)$; $P_{M1}$ represents the first margin; and $P_{M2}$ represents the second margin:

$$\begin{cases} |P_C(t_i)| = P_{M2}, & \text{if } P_{OI}(t_i) \geq P_{M2},\ P_C(t_i) < 0 \\ |P_C(t_i)| = P_{OI}(t_i), & \text{if } P_{OI}(t_i) < P_{M2},\ P_C(t_i) < 0 \\ |P_C(t_i)| = C_C, & \text{if } P_{OI}(t_i) \geq C_C,\ P_C(t_i) < 0 \end{cases} \quad \text{Equation (15)}$$

$$\begin{cases} P_C(t_i) = P_{M1}, & \text{if } P_{OI}(t_i) \geq P_{M1},\ P_C(t_i) > 0 \\ P_C(t_i) = P_{OI}(t_i), & \text{if } P_{OI}(t_i) < P_{M1},\ P_C(t_i) > 0 \\ P_C(t_i) = C_D, & \text{if } P_{OI}(t_i) \geq C_D,\ P_C(t_i) > 0 \end{cases} \quad \text{Equation (16)}$$

After the compensation value $P_C(t_i)$ is calculated, in step S305, the controller 110 compensates the power PI by using the compensation value $P_C(t_i)$ so as to generate the compensated power PO (PI+$P_C(t_i)$=PO). The controller 110 may output the compensated power PO to the power grid of commercial power after performing DC/AC converting through the current converter 130.

In step S306, the controller 110 determines whether the rate of change $P_{ROC}$ of the power PI (or known as a negative rate of change $P_{ROC-}$) exceeds the second margin $P_{M2}$. The negative rate of change $P_{ROC-}$ of the power PI exceeding the second margin $P_{M2}$ indicates that the renewable energy power generation system may be affected by the shading, so that the output power PI thereof shows the sudden drop. Assuming that nT is the current time point, the controller 110 may determine whether the negative rate of change $P_{ROC-}$ the power PI exceeds the second margin $P_{M2}$ according to Equation (17) below. After a difference is obtained from a current time point power P(nT) minus a previous time point power P(nT−1), an absolute value of the difference is divided by the current time point power P(nT) so the negative rate of change $P_{ROC-}$ can then be obtained:

$$P_{ROC-} = \frac{|P(nT) - P(nT-1)|}{P(nT)} > P_{M2} \quad \text{Equation (17)}$$

If the negative rate of change $P_{ROC-}$ of the power PI exceeds the second margin $P_{M2}$, the process proceeds to step S304. If the negative rate of change $P_{ROC-}$ of the power PI does not exceed the second margin $P_{M2}$, the process proceeds to step S301.

In an embodiment, a capacity of the aluminum battery 140 (unit: Ah) is configured based on the output power historical record of the renewable energy power generation system according a wattage corresponding to/calculated from a historical maximum rate of change (e.g., the maximum positive rate of change or the maximum negative rate of change). For example, a rising norm value of a rate of change of the power is calculated by multiplying a field capacity of a specific location by the maximum positive rate of change, and a falling norm value of the rate of change of the power is calculated by multiplying the field capacity by the maximum negative rate of change. If the increase/decrease of the power exceeds the norm values, the manager may configure the capacity of the aluminum battery 140 based on a maximum exceeded power value (i.e., a power value corresponding to the maximum positive rate of change or the maximum negative rate of change). For example, with respect to the power fed into the power grid, it is assumed that a norm value of the maximum positive rate of change is 12%, a norm value of the maximum negative rate of change is 6%, and the output power historical record of the renewable energy generation system is shown in Table 2:

TABLE 2

| Time point | $t_0$ | $t_1$ | $t_2$ | $t_3$ |
|---|---|---|---|---|
| Power value (W) | $c_0$ | $c_1$ | $c_2$ | $c_3$ |
| Excess positive rate change (W) | 101 | 80 | — | — |
| Excess negative rate change (W) | — | — | 111 | 94 |

As can be seen from Table 2, in the worst case, a charging rate of the aluminum battery 140 per unit time needs to exceed 101 W, and a discharging rate of the aluminum battery 140 per unit time needs to exceed 111 W (as the increase/decrease of the power exceeds the norm values, the manager may configure the capacity of the aluminum battery 140 based on the maximum exceeded power value). The manager may configure the capacity of the aluminum battery 140 according to the output power historical record shown in Table 2. Accordingly, the embodiment of Table 2 will adopt the aluminum battery 140 with the capacity of 111 W.

Figure 4:
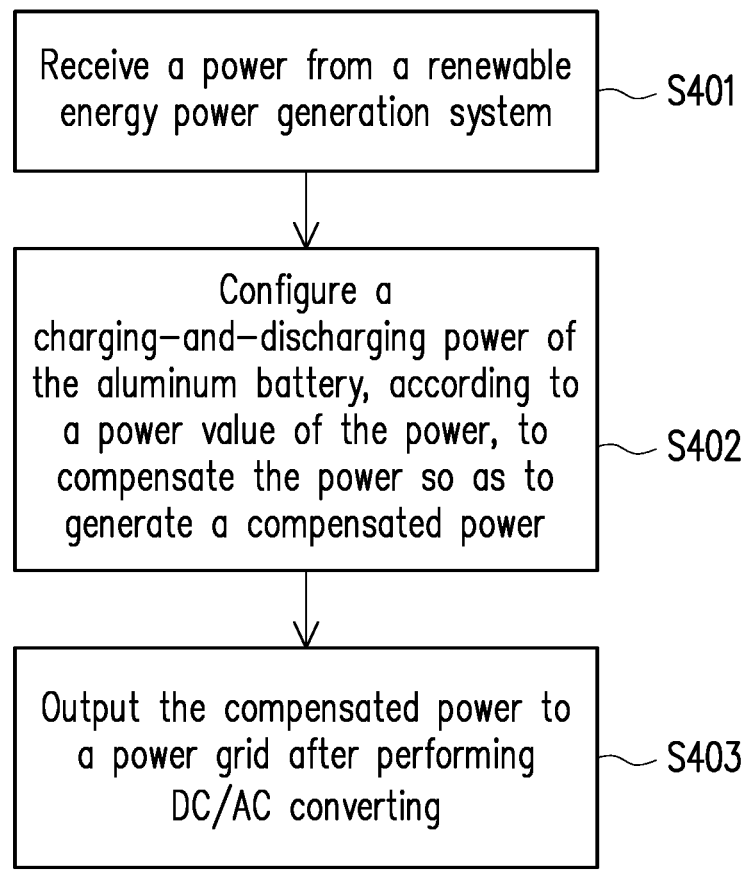
FIG. 4 is a flowchart of a charging-and-discharging method adapted to a renewable energy power generation system illustrated according to another embodiment of the disclosure.

FIG. 4 is a flowchart of a charging-and-discharging method adapted to a renewable energy power generation system illustrated according to another embodiment of the disclosure. The charging-and-discharging method may be implemented by the charging-and-discharging device 100 shown in FIG. 1. In step S401, a power is received from the renewable energy power generation system. In step S402, a charging-and-discharging power of the aluminum battery is configured, according to a power value of the power, to compensate the power so as to generate a compensated power. In step S403, the compensated power is output to a power grid after DC/AC converting is performed.

Table 3 shows an experimental result for smoothing the power output from the renewable energy power generation system at a specific location to the power grid by using the charging-and-discharging device 100 of the disclosure. Here, σ represents a difference in terms of amount of change between the power fed in and a power of the previous minute. In this experiment, the field capacity of the specific location is 210 Wp (a peak watt value), and the maximum positive rate of change of the power fed into the power grid is specified as 12% (i.e., 210*0.12=25.2 W, which is the rising norm value) and the maximum negative change rate is specified as 6% (i.e., 210*0.06=12.6 W, which is the falling norm value). As can be seen from Table 3, in this experiment, a maximum rate of change of the power fed into the power grid (which is the maximum negative rate of change in this experiment) appeared at 12:08, and a power drop exceeded the falling norm value (i.e., 12.6 W) by 111.52 W. Therefore, based on information in Table 3, the manager may configure/adopt the capacity of the aluminum battery 140 according to 111.52 W. Meanwhile, with the smoothing strategy in FIG. 3 of the disclosure and the Equations (15) and (16), the compensation value $P_C(t_i)$ may be calculated for the current power value $P(t_i)$ to compensate the power PI, so as to generate the compensated power PO (PI+$P_C(t_i)$=PO). In this way, the solar panels may be prevented from the sudden decrease and/or the sudden increase due to intermittent shielding, thereby improving the stability of the power grid of commercial power. The power (W) fed in this minute in Table 3 minus the power (W) of the power grid in the previous minute is equal to σ (W) in this minute. An absolute value of σ (|σ|) in this minute minus 25.2 W (the rising norm value) or 12.6 W (the falling norm value) is equal to "Exceeded power of σ rising over 12%" or "Exceeded power of σ falling over 6%" respectively.

TABLE 3

| Time | Power fed in (W) | σ (W) | Power of power grid (W) | Exceeded power of σ rising over 12% (25.2 W) | Exceeded power of σ falling over 6% (12.6 W) |
|---|---|---|---|---|---|
| 11:57 | 195.68 | −2.65 | 195.68 | — | 0.00 |
| 11:58 | 99.38 | −96.30 | 183.08 | — | 83.70 |
| 11:59 | 77.56 | −105.52 | 170.48 | — | 92.92 |
| 12:00 | 137.64 | −32.83 | 157.88 | — | 20.23 |
| 12:01 | 201.84 | 43.96 | 183.08 | 18.76 | — |
| 12:02 | 200.17 | 17.10 | 200.17 | 0.00 | — |
| 12:03 | 192.07 | −8.10 | 192.07 | — | 0.00 |
| 12:04 | 194.90 | 2.83 | 194.90 | 0.00 | — |
| 12:05 | 203.49 | 8.59 | 203.49 | 0.00 | — |
| 12:06 | 172.93 | −30.56 | 190.89 | — | 17.96 |
| 12:07 | 197.53 | 6.64 | 197.53 | 0.00 | — |
| 12:08 | 73.41 | −124.12 | 184.93 | — | 111.52 |
| 12:09 | 77.41 | −107.52 | 172.33 | — | 94.92 |
| 12:10 | 193.60 | 21.27 | 193.60 | 0.00 | — |
| 12:11 | 123.88 | −69.72 | 181.00 | — | 57.12 |
| 12:12 | 73.50 | −107.49 | 168.40 | — | 94.89 |
| 12:13 | 61.88 | −106.52 | 155.80 | — | 93.92 |
| 12:14 | 56.24 | −99.56 | 143.20 | — | 86.96 |
| 12:15 | 56.38 | −86.82 | 130.60 | — | 74.22 |
| 12:16 | 61.00 | −69.60 | 118.00 | — | 57.00 |
| 12:17 | 75.60 | −42.40 | 105.40 | — | 29.80 |
| 12:18 | 202.04 | 96.64 | 130.60 | 71.44 | — |
| 12:19 | 206.41 | 75.81 | 155.80 | 50.61 | — |
| 12:20 | 206.07 | 50.27 | 181.00 | 25.07 | — |
| 12:21 | 202.04 | 21.04 | 202.04 | 0.00 | — |
| 12:22 | 193.87 | −8.17 | 193.87 | — | 0.00 |

In summary, the charging-and-discharging device and charging-and-discharging method of the disclosure may estimate the fitting curve of the power according to the historical record of the power output by the renewable energy power generation system, so as to predict the future change of the power according to the fitting curve. The charging-and-discharging device may estimate the corresponding compensation value according to the fitting curve, and configure the charging-and-discharging power of the aluminum battery according to the estimated compensation value to compensate the power to be output to the power grid. Compared with traditional batteries, the aluminum battery used in this disclosure has a higher C-rate, and the aluminum battery can be quickly charged or discharged. In addition, with the smoothing strategy of the disclosure and compensation methods under various conditions, the real time compensation effect may be achieved. As a result, the charging-and-discharging device may maintain the rate of change of the power within the range in accordance with local regulations while using a battery with a smaller capacity or a smaller volume.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

It will be apparent to those skilled in the art that various modifications and variations can be made to the disclosed embodiments. It is intended that the specification and examples be considered as exemplary only, with a true scope of the present disclosure being indicated by the following claims and their equivalents.

The invention claimed is:

1. A charging-and-discharging device adapted to a renewable energy power generation system, comprising:
a renewable energy converter, receiving a power from the renewable energy power generation system;
an aluminum battery;
a controller, coupled to the renewable energy converter and the aluminum battery, wherein the controller configures a charging-and-discharging power of the aluminum battery according to a power value of the power so as to generate a compensated power; and
a current converter, coupled to the controller, wherein the current converter outputs the compensated power to a power grid after performing DC/AC converting,
wherein the controller generates a fitting curve of the power according to the power value of the power, and configures the charging-and-discharging power of the aluminum battery according to the fitting curve so as to compensate the power.

2. The charging-and-discharging device according to claim 1, wherein the controller calculates a compensation value according to a difference between a current power value of the power and a function value of the fitting curve, and compensates the power according to the compensation value.

3. The charging-and-discharging device according to claim 2, wherein the controller determines that the compensation value is a negative value in response to the current power value greater than the function value of the fitting curve, and determines that the compensation value is a positive value in response to the current power value less than the function value of the fitting curve.

4. The charging-and-discharging device according to claim 2, wherein in response to a ratio of the difference and the current power value greater than or equal to a first margin, and the function value of the fitting curve greater than zero, the controller determines that the compensation value is equal to the first margin, wherein the first margin is defined as a maximum positive rate of change of the power.

5. The charging-and-discharging device according to claim 4, wherein in response to the ratio of the difference and the current power value greater than or equal to a second margin, and the function value of the fitting curve less than zero, the controller determines that an absolute value of the compensation value is equal to the second margin, wherein the second margin is defined as a maximum negative rate of change of the power.

6. The charging-and-discharging device according to claim 4, wherein in response to the ratio of the difference and the current power value less than the first margin, and the function value of the fitting curve greater than zero, the controller determines that the compensation value is equal to the ratio.

7. The charging-and-discharging device according to claim 5, wherein in response to the ratio of the difference and the current power value less than a second margin and the function value of the fitting curve less than zero, the controller determines that the absolute value of the compensation value is equal to the ratio.

8. The charging-and-discharging device according to claim 2, wherein in response to a ratio of the difference and the current power value greater than or equal to a maximum charging rate of the aluminum battery, and the function value of the fitting curve less than zero, the controller determines that an absolute value of the compensation value is equal to the maximum charging rate.

9. The charging-and-discharging device according to claim 2, wherein in response to a ratio of the difference and the current power value greater than or equal to a maximum discharging rate of the aluminum battery, and the function value of the fitting curve greater than zero, the controller determines that the compensation value is equal to the maximum discharging rate.

10. The charging-and-discharging device according to claim 5, wherein values of the first margin and the second margin of the power are different.

11. The charging-and-discharging device according to claim 10, wherein a capacity of the aluminum battery is configured based on a wattage corresponding to a historical maximum rate of change of an output power of the renewable energy power generation system, wherein a field capacity of the renewable energy converter multiplied by the maximum positive rate of change is a rising norm value, and the field capacity multiplied by the maximum negative rate of change is a falling norm value.

12. The charging-and-discharging device according to claim 1, wherein a C-rate of the aluminum battery is between 10 C and 60 C.

13. A charging-and-discharging method adapted to a renewable energy power generation system, comprising:
   receiving a power from the renewable energy power generation system;
   configuring a charging-and-discharging power of an aluminum battery according to a power value of the power so as to generate a compensated power; and
   outputting the compensated power to a power grid after performing DC/AC converting,
   wherein the step of configuring the charging-and-discharging power of the aluminum battery according to the power value of the power so as to generate the compensated power comprises:
   generating a fitting curve of the power according to the power value of the power, and configuring the charging-and-discharging power of the aluminum battery according to the fitting curve so as to compensate the power.

14. The charging-and-discharging method according to claim 13, wherein the step of generating the fitting curve of the power according to the power value of the power, and configuring the charging-and-discharging power of the aluminum battery according to the fitting curve so as to compensate the power comprises:
   calculating a compensation value according to a difference between a current power value of the power and a function value of the fitting curve, and compensating the power according to the compensation value.

15. The charging-and-discharging method according to claim 14, wherein the step of calculating the compensation value according to the difference between the current power value of the power and the function value of the fitting curve comprises:
   determining that the compensation value is a negative value in response to the current power value greater than the function value of the fitting curve, and determining that the compensation value is a positive value in response to the current power value less than the function value of the fitting curve.

16. The charging-and-discharging method according to claim 14, wherein the step of calculating the compensation value according to the difference between the current power value of the power and the function value of the fitting curve comprises:
   in response to a ratio of the difference and the current power value greater than or equal to a first margin, and the function value of the fitting curve greater than zero, determining that the compensation value is equal to the first margin, wherein the first margin is defined as a maximum positive rate of change of the power.

17. The charging-and-discharging method according to claim 16, wherein the step of calculating the compensation value according to the difference between the current power value of the power and the function value of the fitting curve further comprises:
   in response to the ratio of the difference and the current power value greater than or equal to a second margin, and the function value of the fitting curve less than zero, determining that an absolute value of the compensation value is equal to the second margin, wherein the second margin is defined as a maximum negative rate of change of the power.

18. The charging-and-discharging method according to claim 16, wherein the step of calculating the compensation value according to the difference between the current power value of the power and the function value of the fitting curve further comprises:
   in response to the ratio of the difference and the current power value less than the first margin, and the function value of the fitting curve greater than zero, determining that the compensation value is equal to the ratio.

19. The charging-and-discharging method according to claim 17, wherein the step of calculating the compensation value according to the difference between the current power value of the power and the function value of the fitting curve further comprises:
   in response to the ratio of the difference and the current power value less than the second margin, and the function value of the fitting curve less than zero, determining that the absolute value of the compensation value is equal to the ratio.

20. The charging-and-discharging method according to claim 14, wherein the step of calculating the compensation value according to the difference between the current power value of the power and the function value of the fitting curve comprises:
   in response to a ratio of the difference and the current power value greater than or equal to a maximum charging rate of the aluminum battery, and the function value of the fitting curve less than zero, determining that an absolute value of the compensation value is equal to the maximum charging rate.

21. The charging-and-discharging method according to claim 14, wherein the step of calculating the compensation value according to the difference between the current power value of the power and the function value of the fitting curve comprises:
   in response to a ratio of the difference and the current power value greater than or equal to a maximum discharging rate of the aluminum battery, and the function value of the fitting curve greater than zero, determining that the compensation value is equal to the maximum discharging rate.

22. The charging-and-discharging method according to claim 17, wherein values of the first margin and the second margin of the power are different, the first margin is defined as a maximum positive rate of change of the power.

* * * * *